US012248948B1

(12) United States Patent
Rao et al.

(10) Patent No.: US 12,248,948 B1
(45) Date of Patent: Mar. 11, 2025

(54) SYSTEM AND METHOD OF INTEGRATING SOCIAL TRENDS IN ASSORTMENT PLANNING

(71) Applicant: JDA Software Group, Inc., Scottsdale, AZ (US)

(72) Inventors: Machiraju Pakasasana Rama Rao, Hyderabad (IN); Arun Raj Parwana Adiraju, Hyderabad (IN); Abhinav Kishore, Hyderabad (IN); Vineet Chaudhary, Hyderabad (IN); Pawan Singh, Hyderabad (IN); Ankit Goel, Uttar Pradesh (IN); Vaibhav Sharma, Hyderabad (IN)

(73) Assignee: Blue Yonder Group, Inc., Scottsdale, AZ (US)

(*) Notice: Subject to any disclaimer, the term of this patent is extended or adjusted under 35 U.S.C. 154(b) by 116 days.

(21) Appl. No.: 16/392,080

(22) Filed: Apr. 23, 2019

Related U.S. Application Data

(60) Provisional application No. 62/678,544, filed on May 31, 2018.

(51) Int. Cl.
*G06Q 30/0201* (2023.01)
*G06F 16/9536* (2019.01)
(Continued)

(52) U.S. Cl.
CPC ..... *G06Q 30/0201* (2013.01); *G06F 16/9536* (2019.01); *G06N 3/08* (2013.01); *G06Q 10/087* (2013.01)

(58) Field of Classification Search
CPC .............. G06Q 30/0201; G06Q 10/087; G06F 16/9536; G06N 3/08
See application file for complete search history.

(56) References Cited

U.S. PATENT DOCUMENTS 5,184,218 A * 2/1993 Gerdes .................. H04N 19/59
348/E7.016
10,043,109 B1 * 8/2018 Du ......................... G06F 18/22
(Continued)

FOREIGN PATENT DOCUMENTS

| CN | 1632829 A | * | 6/2005 | ........... G06T 3/4015 |
| CN | 105593847 A | * | 5/2016 | ............. G06F 3/005 |
| CN | 109558806 A | * | 4/2019 | ........... G06K 9/0063 |

OTHER PUBLICATIONS

Takahashi, et al.; "Color Demosaicing Using Asymmetric Directional Interpolation and Hue Vector Smoothing." IEICE Transactions on Fundamentals of Electronics, Communications and Computer Sciences; Engineering Sciences Society, vol. E91A. No. 4, Apr. 1, 2008, pp. 978-986. (Year: 2008).*

*Primary Examiner* — Pan G Choy
(74) *Attorney, Agent, or Firm* — Spencer Fane LLP; Steven J. Laureanti

(57) ABSTRACT

A system and method are disclosed for aggregating product trends. Embodiments include receiving an initial set of images from one or more data feeds by a trend aggregation system comprising a server, identifying one or more attribute values from the initial set of images, and quantifying a social affinity score of one or more items of an inventory of a supply chain entity based on recentness, relevance, and similarities of the identified one or more attribute values to an attribute value of a potential product for a product assortment. Embodiments may further include receiving an image of at least one additional item, identifying a product attribute from the image, and assigning an attribute value to the at least one additional item based, at least in part, on the identified attribute value from the image of the least one additional item and the attribute values of the at least two items.

20 Claims, 3 Drawing Sheets

(51) Int. Cl.
*G06N 3/08* (2023.01)
*G06Q 10/087* (2023.01)

(56) References Cited

U.S. PATENT DOCUMENTS

| | | | |
|---|---|---|---|
| 10,755,228 B1* | 8/2020 | Hasan | G06Q 10/087 |
| 2015/0373116 A1* | 12/2015 | Mo | H04L 67/51 |
| | | | 709/219 |
| 2017/0061481 A1* | 3/2017 | Wee | G06Q 30/0201 |
| 2017/0177969 A1* | 6/2017 | Zaremski | G06V 20/52 |
| 2019/0318304 A1* | 10/2019 | Sewak | G06N 3/08 |
| 2020/0111107 A1* | 4/2020 | Herrington | G06Q 30/018 |
| 2020/0387858 A1* | 12/2020 | Hasan | G06Q 10/087 |

* cited by examiner

SYSTEM AND METHOD OF INTEGRATING SOCIAL TRENDS IN ASSORTMENT PLANNING

CROSS-REFERENCE TO RELATED APPLICATIONS

The present disclosure is related to that disclosed in the U.S. Provisional Application No. 62/678,544, filed May 31, 2018, entitled "System and Method of to Integrate Social Trends in Assortment Planning." U.S. Provisional Application No. 62/678,544 is assigned to the assignee of the present application. The subject matter disclosed in U.S. Provisional Application No. 62/678,544 is hereby incorporated by reference into the present disclosure as if fully set forth herein. The present invention hereby claims priority under 35 U.S.C. § 119 (e) to U.S. Provisional Application No. 62/678,544.

TECHNICAL FIELD

The present disclosure relates generally to assortment planning and specifically to a system and method of product trend identification from social media platforms using image recognition to calculate social affinity score for assortment planning.

BACKGROUND

When planning product assortments, fashion retailers often look to upcoming trends to select what products should be included. Planners and buyers of the fashion retailers may select products by leveraging their experience to subjectively interpret how upcoming trends should be represented in future assortments. Although social media and other Internet sources includes information that would be useful in understanding trends, this information is not organized in a way to provide planners and buyers with actionable insights for leveraging the trend information for assortment planning. This inability to leverage trend information from social media and other Internet sources to generate actionable insights for assortment planning is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
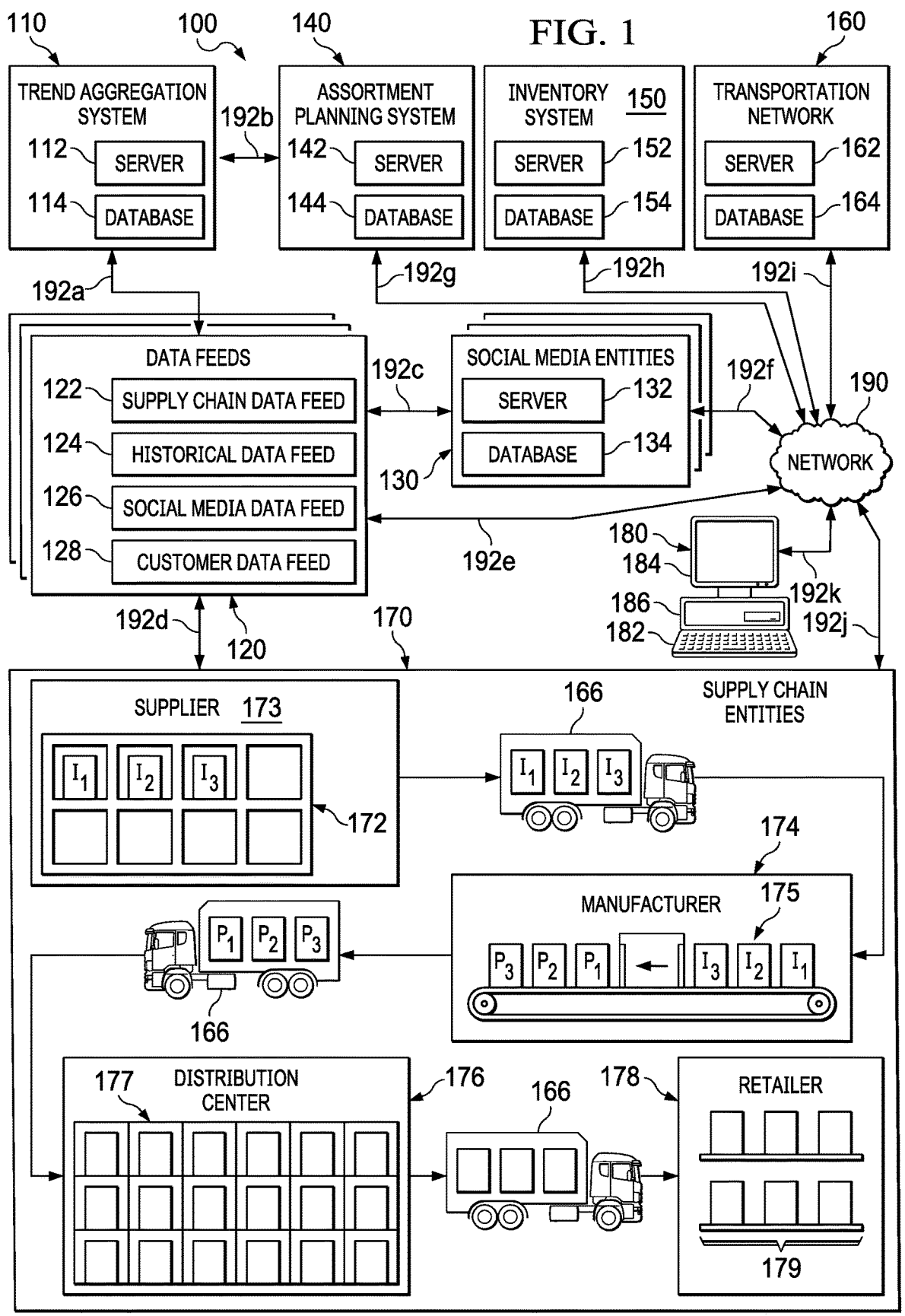
FIG. 1 illustrates an exemplary supply chain network, in accordance with an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to discovering and quantifying trends to validate and select product assortments. Given that the tastes of fashion retail customers are dynamic, have short life cycles, and are not well predicted by recent purchase history, fashion retail planners and buyers (including, for example, assortment planners, merchandise managers, and the like) may attempt to predict fashion merchandise buying patterns by uncovering and identifying new and upcoming trends. Social media and other Internet sources comprise a wealth of information related to trends as well as additional information for customer feedback, preferences, and dislikes.

As described in more detail below, embodiments of the current disclosure provide for selecting and configuring one or more data feeds to fetch data from one or more social media entities and one or more supply chain entities, identifying a product or image from one or more data feeds 120, discovering one or more trends, identifying trends relevant to a planned product assortment, quantifying trends, uncovering new trends, and automatically generating context-specific trend information for assortment planners for one or more assortment planning periods.

FIG. 1 illustrates exemplary supply chain network 100, in accordance with an embodiment. Supply chain network 100 may comprise trend aggregation system 110, one or more data feeds 120, one or more social media entities 130, assortment planning system 140, inventory system 150, transportation network 160, one or more supply chain entities 170, computer 180 180, network 190, and communication links 192a-192l. Although a single trend aggregation system, 110 one or more data feeds 120, one or more social media entities 130, a single assortment planning system 140, a single inventory system 150, a single transportation network 160, one or more supply chain entities 170, a single computer 180, a single network 190, and one or more communication links 192a-192l are shown and described, embodiments contemplate any number of trend aggregation systems, data feeds, social media entities, assortment planning systems, inventory systems, transportation systems, supply chain entities, computers, networks, or communication links, according to particular needs.

In one embodiment, trend aggregation system 110 comprises server 112 and database 114. According to embodiments, trend aggregation system 110 identifies trends from one or more data feeds 120 that may affect which products should be included in a product assortment. Selecting a product assortment, which may be referred to as assortment planning, comprises determining what products should be sold during a particular time period at one or more retailers. Each product is described by one or more product attributes and product attribute values. Product attributes may comprise characteristics that distinguish one product from another, including, for example, size, weight, dimensions, color, item identifier, style, price, and the like. Product attribute values may comprise a specific value of the characteristic for each particular product, such as, for example, one or more numerical values (for size, weight, dimensions, and price) or one or more descriptive terms, such as, for example, red, blue, green, or yellow (for color), and modern, contemporary, or classic (for style). By way of further explanation and not of limitation, an additional example is given in connection with an exemplary fashion retailer. The exemplary fashion retailer may sell fashion retail products such as shirts, shoes, dresses, skirts, socks, purses, suits, and other like clothing and accessories. Product attributes for the fashion retail products may comprise, for example, gender, season, article of clothing, color, sleeve-length, price segment, pattern, and the like. Exemplary attribute values for these attributes may include, for example, male or female (for gender), spring, summer, fall, or winter (for season), top, blouse, shirt, bottom, pants, shorts, or skirt (for article of clothing), red, blue, green, or yellow (for color), long, short, or medium (for sleeve-length), good, better, or best (for price segment), and stripe, checked, or plain (for pattern). Although particular products comprising particular attributes and attribute values are described herein, embodiments contemplate any supply chain or retail products being associated with any product attributes and attribute values, accordingly to particular needs.

When planning a product assortment for an upcoming planning period, product assortment planning system 140 selects the products to include in the product assortment based, at least in part, on forecasted consumer demand for one or more products, product attributes, and/or product attribute values. For example, assortment planning system 140 may identify one or more products which are forecasted to sell well during an upcoming planning period based on past sales of that product. In addition, assortment planning system 140 may select one or more trending products to include in the product assortment. A trending product comprises a combination of product attribute values (such as, for example, particular colors, styles, or patterns), wherein one or more of the product attribute values are associated with an identified trend that is predicted to lead to an increase in consumer demand for the trending product.

The identified trends may comprise, for example, predictions whether a product having one or more particular product attribute values will affect a future product assortment. According to embodiments, trend identification system 110 monitors and analyzes social media information by tracking social media posts which may include images of products sold by a retailer. According to embodiments, trend aggregation system 110 processes images of products retrieved from one or more social media entities 130 and/or one or more additional locations local to, or remote from, supply chain network 100, analyzes the images to identify products and product attribute values of the imaged products, labels and categorizes the identified products and product attribute values, and analyzes the identified product and product attribute values in connection with data received from one or more data feeds 120 which source data from one or more locations local to, or remote from, supply chain network 100 to determine whether trends for the identified product and product attributes will affect which products should be selected for inclusion in a product assortment, as described in more detail below. As described in more detail below, trend aggregation system 110 processes images received from one or more data feeds 120, one or more social media entities 130, assortment planning system 140, inventory system 150, transportation network 160, one or more supply chain entities 170, product data 220 of database 114, one or more imaging sensors associated with, for example, a camera or scanner, and/or one or more additional locations local to, or remote from, supply chain network 100.

According to embodiments, trend aggregation system 110 may also comprise one or more modules that receive, store, and transmit data about one or more products or items (including images of products, color codes, pricing data, attributes, and attribute values) and one or more modules that define product and attribute identification models. According to some embodiments, the functions and methods described in connection with imaging, processing images, analyzing images to identify products, product attributes, product attribute values, and/or one or more features, and analyze the identified products, product attributes, product attribute values, and/or one or more features may be directly performed, wholly or partially, by one or more image processors coupled with trend aggregation system 110, one or more data feeds 120, one or more social media entities 130, assortment planning system 140, and/or by one or more modules configured to perform the functions and methods as described. Additionally, as described in more detail below, trend aggregation system 110 may receive data, including product images, from one or more data feeds 120 which source data from one or more locations local to, or remote from, supply chain network 100. Trend aggregation system 110 may filter one or more data feeds 120 based on a product chosen for a product assortment by assortment planning system 140.

According to embodiments, one or more data feeds 120 may comprise data received from one or more social media entities 130, assortment planning system 140, inventory system 150, and one or more supply chain entities 170. One or more data feeds 120 may comprise supply chain data feed 122, historical data feed 124, social media data feed 126, and customer data feed 128. Supply chain data feed 122 may comprise supply chain data received from one or more supply chain entities 170 (including, for example, one or more point-of-sale systems at retailers 178, inventory levels at one or more stocking locations, production and other supply chain plans, and the like). Historical data feed 124 may comprise historical data received from assortment planning system 140, inventory system 150, and one or more supply chain entities 170. For example, historical data feed 124 may comprise sales and demand data from one or more previous planning periods, including, for example, previously forecasted demand for one or more products and the difference between the forecasted demand and the actual sales for the product during that period. Social media data feed 126 comprises social media data received from one or more social media entities 130 (including, for example, filtered data from one or more social media sources and image data). Customer data feed 128 comprises customer data received from assortment planning system 140 and one or more supply chain entities 170. Customer data may comprise, for example, products and attributes featured in fashion and trade shows, customer surveys, customer focus groups, and the like. Although particular examples of one or more data feeds 120 are described and illustrated, embodiments contemplate one or more additional data feeds that retrieve data from one or more locations local to, or remote from, supply chain network 100.

One or more social media entities 130 may comprise one or more social media websites or data sources comprising images, ratings, likes, scores, or other data that may be used by trend aggregation system 110 to analyze interactions and sentiments of social media users and identify trends for products and product attributes of a future planned assortment. For example, one or more social media entities 130 may comprise a website where users post text, images, movies, songs, and other media to share with family, friends, and other social groups. Users may then interact with the posted media by discussing, reposting, rating, and other interactions, which are also shared with family, friends, and other social groups. One or more social media entities 130 may comprise, for example, PINTEREST, INSTAGRAM, FACEBOOK, TWITTER, and the like. As described in more detail below, trend aggregation system 110 filters the content from one or more social media entities 130 to identify a product or product attributes, determine the context of the product or product attributes, and determine whether the context indicates that the product or product attributes are likely to be trending during a future planned product assortment. For example, trend aggregation system 110 may identify a product or a product attribute from an image and determine a sentiment for the identified product or product attribute by calculating the number of times the image is reposted, the number of positive or negative comments associated with the image, the number and/or types of tags or emotions associated with the image (such as, for example, a thumbs up, thumbs down, laugh, or other emotion associated with the image), and the like. In addition, the effect of recentness and relevance is taken into account to compute trends. Based on the sentiment associated with the product or product attribute, trend aggregation system 110 may indicate to assortment planning system 140 an indication whether the product or product attribute is likely to be trending during a future assortment planning period.

In one embodiment, assortment planning system 140 comprises server 142 and database 144. According to embodiments, assortment planning system 140 receives one or more sentiment scores or identified trends from trend aggregation system 110 and provides for planning and selecting a product assortment based on the received sentiment score or identified trend. In addition, assortment planning system 140 may provide for storing, viewing, sorting, and selecting data relating to one or more products, attributes, and assortments. For example, assortment planning system 140 may receive product images and data, which may be organized and sorted according to one or more of product attributes, attribute values, product identifiers, sales quantities, demand forecasts, and any other suitable metric, value, category, dimension, and the like. To identify trends for an upcoming season, assortment planning system 140 may evaluate the performance of trending products or product attribute values for the current season by, for example, analyzing the performance of particular products and product attribute values, identifying upcoming fashion trends, and the like. Continuing with the previous example of the exemplary fashion retailer, assortment planning system 110 may divide years into two assortment planning periods. According to embodiments, exemplary fashion retailer plans product assortments for two planning periods: a first planning period corresponding to spring and summer (which may be referred to as the spring/summer season) and a second planning period corresponding to fall and winter (which may be referred to as the fall/winter season). In addition, the lead time between selecting a product assortment and receiving sufficient stock to begin selling the product lasts approximately seven to eight months and includes, for example, placing orders with one or more vendors, providing product designs to the one or more vendors, procuring raw materials, dyeing or printing cloth, stitching and assembling product samples, receiving delivery of the product samples, and manufacturing and stocking sufficient product inventory in sufficient quantities at one or more stocking locations of distribution centers 176, retailers 178, regional warehouses, and the like. Because of the lengthy lead time between selecting a product assortment and receiving sufficient stock of the selected products, assortment planning system 140 begins planning a product assortment for the fall 2018/winter 2019 season during the spring/summer season 2018 season. Although assortment planning system 140 must select product assortments far in advance of selling a particular product, trends for retail products (such as, for example, the exemplary fashion retail products) change quickly, and the trends identified when planning the product assortment may no longer be relevant during the season in which the products are sold.

Inventory system 150 comprises server 152 and database 154. Server 152 stores and retrieves item data from database 154 or from one or more locations in supply chain network 100. Database 154 of inventory system 150 is configured to receive and transmit item data, including item identifiers, pricing data, attribute data, inventory levels, and other like data about one or more items at one or more locations in supply chain network 100. As discussed above, inventory system 150 may send current inventory levels to trend aggregation system 110 and, in response, trend aggregation system 110 may indicate whether the current inventory levels will be sufficient to meet one or more identified trends.

Transportation network 160 comprises server 162 and database 164. According to embodiments, transportation network 160 directs one or more transportation vehicles 166 to ship one or more items between one or more supply chain entities 170, based, at least in part, on trend identification, product and attribute identification, and/or product assortment selection or alteration determined by trend aggregation system 110, the number of items currently in stock at one or more supply chain entities 170, the number of items currently in transit in transportation network 160, forecasted demand, a supply chain disruption, and/or one or more other factors described herein. One or more transportation vehicles 166 comprise, for example, any number of trucks, cars, vans, boats, airplanes, unmanned aerial vehicles (UAVs), cranes, robotic machinery, or the like. One or more transportation vehicles 166 may comprise radio, satellite, or other communication that communicates location information (such as, for example, geographic coordinates, distance from a location, global positioning satellite (GPS) information, or the like) with trend aggregation system 110, one or more data feeds 120, one or more social media entities 130, assortment planning system 140, inventory system 150, transportation network 160, and/or one or more supply chain entities 170 to identify the location of one or more transportation vehicles 166 and the location of any inventory or shipment located on one or more transportation vehicles 166.

As shown in FIG. 1, supply chain network 100 operates on one or more computers 160 that are integral to or separate from the hardware and/or software that support trend aggregation system 110, one or more data feeds 120, one or more social media entities 130, assortment planning system 140, inventory system 150, transportation network 160, one or more supply chain entities 170, and network 190. Supply chain network 100 comprising trend aggregation system 110, one or more data feeds 120, one or more social media entities 130, assortment planning system 140, inventory system 150, transportation network 160, one or more supply chain entities 170, and network 190 may operate on one or more computers that are integral to or separate from the hardware and/or software that support trend aggregation system 110, one or more data feeds 120, one or more social media entities 130, assortment planning system 140, inventory system 150, transportation network 160, one or more supply chain entities 170, and network 190. Computers 180 may include any suitable input device 182, such as a keypad, mouse, touch screen, microphone, or other device to input information. Output device 184 may convey information associated with the operation of supply chain network 100, including digital or analog data, visual information, or audio information. Computer 180 may include fixed or removable computer-readable storage media, including a non-transitory computer readable medium, magnetic computer disks, flash drives, CD-ROM, in-memory device or other suitable media to receive output from and provide input to supply chain network 100.

Computer 180 may include one or more processors 186 and associated memory to execute instructions and manipulate information according to the operation of supply chain network 100 and any of the methods described herein. In addition, or as an alternative, embodiments contemplate executing the instructions on computer 180 that cause computer 180 to perform functions of the methods. Further examples may also include articles of manufacture including tangible non-transitory computer-readable media that have computer-readable instructions encoded thereon, and the instructions may comprise instructions to perform functions of the methods described herein.

In addition, and as discussed herein, supply chain network 100 may comprise a cloud-based computing system having processing and storage devices at one or more locations, local to, or remote from trend aggregation system 110, one or more data feeds 120, one or more social media entities 130, assortment planning system 140, inventory system 150, transportation network 160, and one or more supply chain entities 170. In addition, each of the one or more computers 180 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with trend aggregation system 110, one or more data feeds 120, one or more social media entities 130, assortment planning system 140, inventory system 150, transportation network 160, and one or more supply chain entities 170. These one or more users may include, for example, a "manager" or a "planner" handling assortment planning, merchandise management, trend identification, customer segmentation, and/or one or more related tasks within supply chain network 100. In addition, or as an alternative, these one or more users within supply chain network 100 may include, for example, one or more computers 180 programmed to autonomously handle, among other things, one or more supply chain processes such as, for example, assortment planning, merchandise management, customer segmentation, demand planning, supply and distribution planning, inventory management, allocation planning, order fulfilment, adjustment of manufacturing and inventory levels at various stocking points, and/or one or more related tasks within supply chain network 100.

One or more supply chain entities 170 represent one or more supply chain networks, including one or more enterprises, such as, for example networks of one or more suppliers 172, one or more manufacturers 174, one or more distribution centers 176, one or more retailers 178 (including brick and mortar and online stores), one or more customers, and/or the like. Suppliers 172 may be any suitable entity that offers to sell or otherwise provides one or more items (i.e., materials, components, or products) to one or more manufacturers 174. Suppliers 172 may comprise automated distribution systems 173 that automatically transport products to manufacturers 174 in response to and at least partially based on a selected product assortment, identified trends, a social sentiment score, demand forecasts, and/or one or more other factors described herein.

Manufacturers 174 may be any suitable entity that manufactures at least one product. Manufacturers 174 may use one or more items during the manufacturing process to produce any manufactured, fabricated, assembled, or otherwise processed item, material, component, good, or product. In one embodiment, a product represents an item ready to be supplied to, for example, one or more supply chain entities 170 in supply chain network 100, such as retailers 178, an item that needs further processing, or any other item. Manufacturers 174 may, for example, produce and sell a product to suppliers 172, other manufacturers, distribution centers 176, retailers 178, a customer, or any other suitable person or entity. Manufacturers 174 may comprise automated robotic production machinery 175 that produce products in response to and at least partially based on a selected product assortment, identified trends, a social sentiment score, demand forecasts, and/or one or more other factors described herein.

Distribution centers 176 may be any suitable entity that offers to store or otherwise distribute at least one product to one or more retailers 178 and/or customers. Distribution centers 176 may, for example, receive a product from a first supply chain entity of one or more supply chain entities 170 in supply chain network 100 and store and transport the product for a second supply chain entity of one or more supply chain entities 170. Distribution centers 176 may comprise automated warehousing systems 177 that automatically remove products from and place products into inventory in response to and at least partially based on a selected product assortment, identified trends, a social sentiment score, demand forecasts, and/or one or more other factors described herein.

Retailers 178 may be any suitable entity that obtains one or more products to sell to one or more customers. Retailers 178 may comprise any online or brick-and-mortar store, including stores with shelving systems 179. Shelving systems 179 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of retailers 178 based on computer-generated instructions or automatically by machinery to place products in a desired location in retailers 178 in response to and at least partially based on a selected product assortment, identified trends, a social sentiment score, demand forecasts, and/or one or more other factors described herein.

Although one or more supply chain entities 170 are shown and described as separate and distinct entities, the same entity may simultaneously act as any one of one or more supply chain entities 170. For example, one or more supply chain entities 170 acting as a manufacturer can produce a product, and the same entity of one or more supply chain entities 170 can act as a supplier to supply an item to itself or another of one or more supply chain entities 170. Although one example of supply chain network 100 is shown and described, embodiments contemplate any configuration of supply chain network 100, without departing from the scope described herein.

In one embodiment, trend aggregation system 110 may be coupled with one or more data feeds 120 using communications link 192a, which may be any wireline, wireless, or other link suitable to support data communications between trend aggregation system 110 and one or more data feeds 120 during operation of supply chain network 100. In one embodiment, trend aggregation system 110 may be coupled with assortment planning system 140 using communications link 192b, which may be any wireline, wireless, or other link suitable to support data communications between trend aggregation system 110 and assortment planning system 140 during operation of supply chain network 100. One or more data feeds 120 may be coupled with one or more social media entities 130 using communications link 192c, which may be any wireline, wireless, or other link suitable to support data communications between one or more data feeds 120 and one or more social media entities 130 during operation of supply chain network 100. One or more data feeds 120 may be coupled with one or more supply chain entities 170 using communications link 192d, which may be any wireline, wireless, or other link suitable to support data communications between one or more data feeds 120 and one or more supply chain entities 170 during operation of supply chain network 100. One or more data feeds 120 may be coupled with network 190 using communications link 192e, which may be any wireline, wireless, or other link suitable to support data communications between one or more data feeds 120 and network 190 during operation of supply chain network 100.

In one embodiment, one or more social media entities 130 may be coupled with network 190 using communications link 192f, which may be any wireline, wireless, or other link suitable to support data communications between one or more social media entities 130 and network 190 during operation of supply chain network 100. In one embodiment, assortment planning system 140 may be coupled with network 190 using communications link 192g, which may be any wireline, wireless, or other link suitable to support data communications between assortment planning system 140 and network 190 during operation of supply chain network 100. Inventory system 150 may be coupled with network 190 using communications link 192h, which may be any wireline, wireless, or other link suitable to support data communications between inventory system 150 and network 190 during operation of supply chain network 100. Transportation network 160 may be coupled with network 190 using communications link 192i, which may be any wireline, wireless, or other link suitable to support data communications between transportation network 160 and network 190 during operation of supply chain network 100. One or more supply chain entities 170 may be coupled with network 190 using communications link 192j, which may be any wireline, wireless, or other link suitable to support data communications between one or more supply chain entities 170 and network 190 during operation of supply chain network 100. Computer 180 may be coupled with network 190 using communications link 192k, which may be any wireline, wireless, or other link suitable to support data communications between computer 180 and network 190 during operation of supply chain network 100.

Although the communication links are shown as generally coupling trend aggregation system 110 to one or more data feeds 120 and assortment planning system 140, coupling one or more data feeds 120 to trend aggregation system 110, one or more social media entities 130, one or more supply chain entities 170, and network 190, coupling one or more social media entities 130 to one or more data feeds 120 and one or more supply chain entities 170, coupling assortment planning system 140 to trend aggregation system 110 and network 190, coupling one or more supply chain entities 170 to one or more data feeds 120, one or more social media entities 130, and network 190, and coupling inventory system 150, transportation network 160, and computer 180 to network 190, any of trend aggregation system 110, one or more data feeds 120, one or more social media entities 130, assortment planning system 140, inventory system 150, transportation network 160, one or more supply chain entities 170, and computer 180 may communicate directly with each other and network 190, according to particular needs.

In another embodiment, network 190 includes the Internet and any appropriate local area networks (LANs), metropolitan area networks (MANs), or wide area networks (WANs) coupling trend aggregation system 110, one or more data feeds 120, one or more social media entities 130, assortment planning system 140, inventory system 150, transportation network 160, one or more supply chain entities 170, and computer 180. For example, data may be maintained local to, or externally of, trend aggregation system 110, one or more data feeds 120, one or more social media entities 130, assortment planning system 140, inventory system 150, transportation network 160, one or more supply chain entities 170, and computer 180 and made available to one or more associated users of trend aggregation system 110, one or more data feeds 120, one or more social media entities 130, assortment planning system 140, inventory system 150, transportation network 160, one or more supply chain entities 170, and computer 180 using network 190 or in any other appropriate manner. For example, data may be maintained in a cloud database at one or more locations external to trend aggregation system 110, one or more data feeds 120, one or more social media entities 130, assortment planning system 140, inventory system 150, transportation network 160, one or more supply chain entities 170, and computer 180 and made available to one or more associated users of trend aggregation system 110, one or more data feeds 120, one or more social media entities 130, assortment planning system 140, inventory system 150, transportation network 160, one or more supply chain entities 170, and computer 180 using cloud architecture or in any other appropriate manner. Those skilled in the art will recognize that the complete structure and operation of network 190 and other components within supply chain network 100 are not depicted or described. Embodiments may be employed in conjunction with known communications networks and other components.

In accordance with the principles of embodiments described herein, trend aggregation system 110 may generate a social sentiment score, supply chain demand forecasts, product assortments, predicted rate of sale for the inventory of one or more supply chain entities 170 in supply chain network 100. Furthermore, trend aggregation system 110 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities, and the configuration and quantity of packaging and shipping of items based on a forecasted rate of sale, trend quantification score, trend identification, supply chain demand forecasts, product assortments, one or more other factors described herein, and/or current inventory or production levels. For example, the methods described herein may include one or more computers 180 receiving product data from automated machinery having at least one sensor and product data 220 (FIG. 2) corresponding to an item detected by the automated machinery. The received product data may include an image of the item, an identifier, as described above, a product attribute associated with the item (dimensions, texture, estimated weight, and the like), and/or the like. The method may further include one or more computers 180 looking up the received product data 220 in database 114 associated with trend aggregation system 110 to identify the item and/or an attribute corresponding to product data 220 received from the automated machinery.

Computers 180 may also receive a current location of an identified item. Based on the identification of the item, computers 180 may also identify (or alternatively generate) a first mapping in the database system, where the first mapping is associated with the current location of the identified item. Computers 180 may also identify a second mapping in the database system, where the second mapping is associated with a past location of the identified item. Computers 180 may also compare the first mapping and the second mapping to determine if the current location of the identified item in the first mapping is different than the past location of the identified item in the second mapping. Computers 180 may then send instructions to the automated machinery based, as least in part, on one or more differences between the first mapping and the second mapping such as, for example, to locate items to add to or remove from an inventory of or package for one or more supply chain entities 170.

Figure 2:
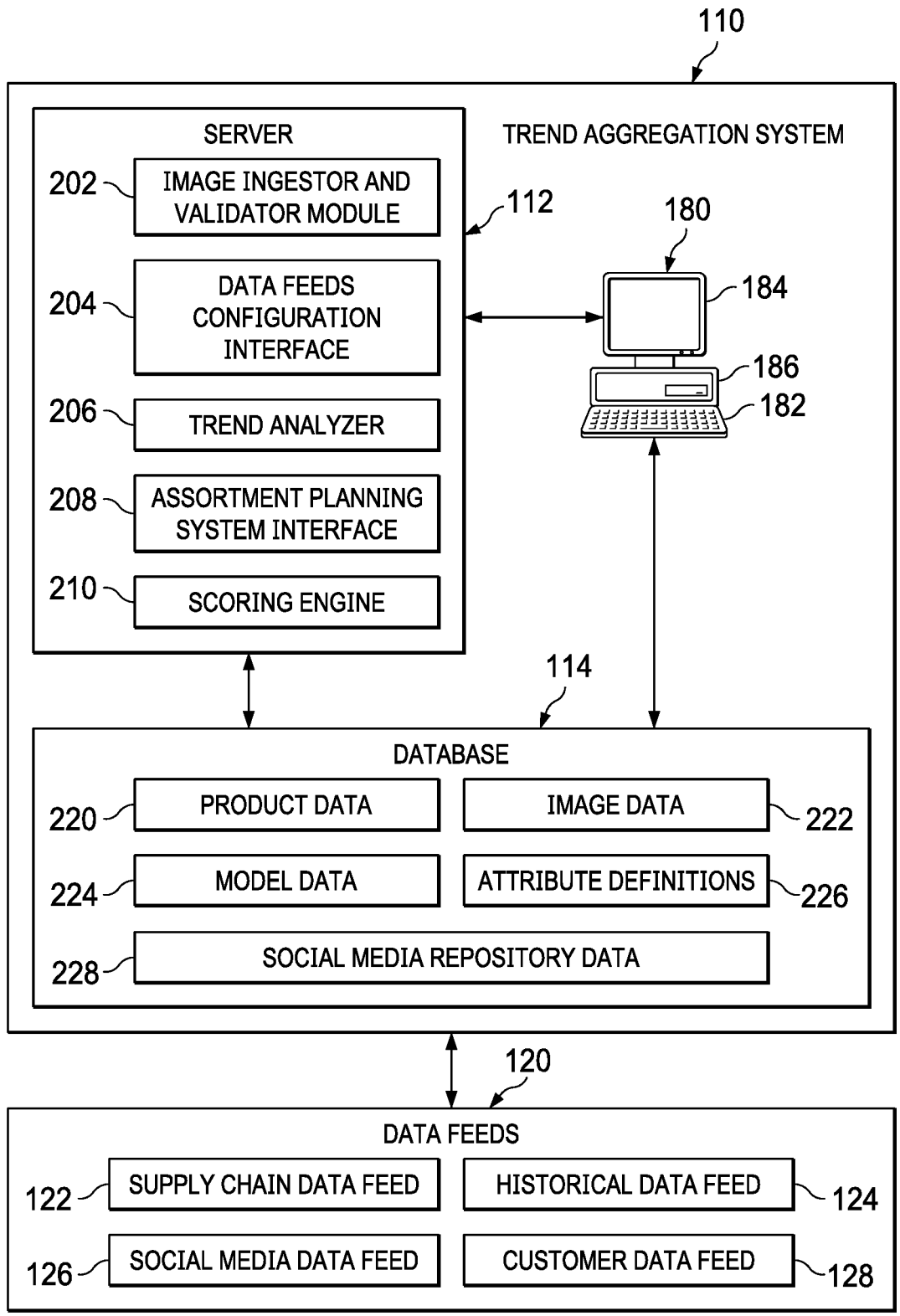
FIG. 2 illustrates trend aggregation system 110 of FIG. 1 in greater detail, in accordance with an embodiment.

FIG. 2 illustrates trend aggregation system 110 of FIG. 1 in greater detail, according to an embodiment. As discussed above, trend aggregation system 110 comprises one or more computers 180 at one or more locations including associated input devices 182, output devices 184, non-transitory computer-readable storage media, processors 186, memory, or other components for receiving, processing, storing, and communicating information according to the operation of trend identification system 110. As discussed in more detail below, trend aggregation system 110 comprises server 112 and database 114. Although trend aggregation system 110 is shown as comprising server 112 and database 114, embodiments contemplate any suitable number of computers, servers, or databases internal to or externally coupled with trend aggregation system 110.

Server 112 comprises image ingester and validator engine 202, data feeds configuration interface 204, trend analyzer 206, assortment planning interface system 208, and scoring engine 210. Although server 112 is shown and described as comprising a single image ingester and validator engine 202, a single data feeds configuration interface 204, a single trend analyzer 206, a single assortment planning interface system 208, and a single scoring engine 210, embodiments contemplate any suitable number or combination of these located at one or more locations local to, or remote from, trend aggregation system 110, such as on multiple servers or computers in supply chain network 100.

According to an embodiment, image ingester and validator module 202 of server 112 analyzes images of products, identifies the products and/or product attributes of the images, groups and categorizes products and attributes, and performs other image processing and preprocessing. According to some embodiments, image ingester and validator module 202 sources data from one or more configurable sources, such as, for example, one or more social media entities 130, fashion blogs, retailer websites, and/or other sources of product images, product reviews, and the like. According to embodiments, trend aggregation system 110 receives product images or image data 222 as input to a convolutional neural network model. The convolutional neural network model learns model parameters in an unsupervised fashion to identify product category and/or product attributes. Image ingester and validator module 202 saves the identified product category and/or product attributes data with the image features as image data 222 of database 114.

Data feeds configuration interface 206 of trend aggregation system 110 comprises a user interface for selecting and altering configuration parameters for one or more data feeds 120. According to an embodiment, data feeds configuration interface 206 provides for configuring one or more data feeds 120 to retrieve, filter, select, store, identify, and receive images of products and associated product data such as, for example, attribute data, color codes, pricing data, and other like data from one or more locations local to, or remote from, supply chain network 100 including one or more databases associated with trend aggregation system 110, one or more data feeds 120, one or more social media entities 130, assortment planning system 140, inventory system 150, transportation network 160, and one or more supply chain entities 170. According to one embodiment, one or more data feeds 120 may automatically or periodically collect data from one or more data resources and store the data in database 114 of trend identification system 110 in accordance with configuration parameters altered or selected with data feeds configuration interface 206.

For example, trend aggregation system 110 may configure social media data feed 126 to retrieve trending or recent images, pins, and other associated data from one or more PINTEREST boards. According to embodiments, trend identification system 110 configures social media data feed 126 to retrieve data from a PINTEREST board to update trend information for a particular product, look, fashion, brand, user, tag, or other like characteristics automatically at scheduled times, or in response to detection or notification of new images, pins, or other associated data on the PINTEREST board, according to particular needs. In addition, trend aggregation system 110 may configure social media data feed 126 to retrieve trending or recent images, shares, and likes from one or more INSTAGRAM feeds. According to embodiments, trend aggregation system 110 configures social media data feed 126 to retrieve data from an INSTAGRAM feed to update trend information for a particular product, look, fashion, brand, user, tag, or other like characteristics automatically at scheduled times, or in response to detection or notification of new images on one or more INSTAGRAM feeds, according to particular needs. By way of a third example, trend aggregation system 110 may configure social media data feed 126 to retrieve trending or recent images, shares, and likes from the results of one or more INSTAGRAM searches, including searches based on one or more tags. According to embodiments, trend aggregation system 110 configures social media data feed 126 to retrieve data from the INSTAGRAM search results to update trend information for a particular product, look, fashion, user, tag, or other like characteristics automatically at scheduled times, or in response to detection or notification of new search results, according to particular needs.

Although one or more data feeds 120 are illustrated and described in connection with one or more particular resources, embodiments contemplate trend identification system 110 to configure one or more data feeds 120 to retrieve data from any one or more social media entities 130, one or more user-updated Internet resources including, for example, blogs, product reviews websites, consumer reviews, online retailers, and the like.

According to some embodiments, trend analyzer 206 comprises one or more modules that, in response to receiving data from one or more data feeds 120 and/or from social media repository data 228, runs a sentiment and trend analysis based on one or more attributes. Embodiments contemplate analyzing trends on one or more products or product attributes received from assortment planning system 140 and/or automatically detecting trending products and product attributes from one or more data feeds 120. For example, trend analyzer 206 may automatically detect products or product attributes from one or more trending images from one or more social media entities 130 and analyze whether the sentiment associated with the identified product and/or product images indicates that the product and/or product attributes will be trending during an assortment planning period. For example, if a combination of "Red" and "Jacket" has a lot of instances in frequently re-posted images, trend analyzer 206 may identify and flag these attributes and/or attribute combinations as a positive trend. Similarly, if an attribute or attribute combination has a lot of negative comments, trend analyzer 206 may identify and flag it as a "negative trend." According to embodiments, trend analyzer 206 may analyze data received from one or data feeds 120 and record the following data with each identified combination of attributes and/or products: identity of one or more attributes, product category/categories which can have such attributes, images which fit this set (sorted descending from best match), URL or other source of the one or more data feeds 120, sentiment for each image (number of pins/positive or negative words in comments, etc.), season meta-attribute, and the like. As discussed in more detail herein, trend analyzer 206 excludes a set of attributes from a trend analysis when the attributes comprise conflicting season meta-attributes. For example, an identified trend may not include an attribute identified by its seasonal meta-attribute as a winter attribute in the same trend as an attribute identified by its seasonal meta-attribute as a summer attribute.

According to an embodiment, assortment planning system interface 208 of trend aggregation system 110 controls the content of analyzed trend information presented to assortment planning system 140 and the timing and context of its presentation. For example, assortment planning system interface 208 may comprise embedding and contextually presenting the analyzed trend information to assortment planning system 140. According to embodiments, assortment planning system interface 208 determines or receives an indication that assortment planning system 140 should receive analyzed trend information and may include a particular product, one or more product attributes, a time period, or other like data. The determination or indication may comprise a determination or indication that assortment planning system 140 is planning a product assortment for an upcoming planning period and may include product, product category, product attributes being considered for including or excluding from the product assortment, and the like. In response to the determination or indication, assortment planning system interface 208 automatically populates the relevant set of trends at least partially based on the context, such as, for example, a season, product category, and other like assortment planning considerations.

For example, when assortment planning system 140 builds an assortment for a particular product category for a particular season (such as, for example, building an assortment for Men's T-shirts for autumn/winter 2018), assortment planning system interface 208 does not retrieve trends that are associated with only a different season (such as, for example, the spring/summer fashion season). In addition, assortment planning system interface 208 may also ignore or discount trends comprising at least one attribute that is not relevant to the particular product category. Continuing with the exemplary Men's T-shirts product category, assortment planning system interface 210 may include trend information for "blue" attributes (which may be the color attribute for products in many categories) but may ignore trend information for "wooden wedges" (which is related to only a women's shoes product category).

In addition, assortment planning system interface 208 may consider one or more seasonal meta-attributes when determining which trend information should be provided to assortment planning system 140. Some products and product attributes are influenced by trends only during particular time periods or are influenced differently during different time periods. The one or more seasonal meta-attributes are associated with one or more attributes and one or more time periods during which the attribute is classified as being affected by trends. Time periods specified in seasonal meta-attributes may include for example, a retail fashion planning season, an assortment planning period, particular days, weeks, months, seasons, scheduled events (such as, for example, school schedules and sporting events), or the like. For example, for most color attributes, the season meta-attribute will be "any," (indicating that the color has little or no seasonal trend effect) but, for other attributes, such as, for example, "quilted," "padded," or "leather", the season meta-attribute may be "winter" (indicating that these attribute affects trends differently in the winter than in other seasons). For a "sleeveless" attribute, the season meta-attribute may be "summer" (indicating that the sleeveless attribute affects trends differently in the summer than in other seasons). Trend aggregation system 110 may identify the time period indicated in the one or more seasonal meta-attributes and calculates one or more trends for only that time period. In addition, when product assortment planning system 208 identifies that assortment planning system 140 is planning an assortment for a particular time period identified in a meta-attribute (such as, for example, the spring/summer fashion retail season), assortment planning system interface 208 excludes trend information from a different time period (such as, for example, a fall/winter fashion retail season).

In addition, assortment planning system interface 208 may exclude trends for products and product attributes that are unlikely to be influenced by trends from the identified trend information received by assortment planning system 140 from trend aggregation system 110. According to some embodiments, assortment planning system 140 distinguishes one or more attributes or combination of attributes that are unlikely to be influenced by trends (such as, for example, price, fabric, brand, seasonality, and the like) from one or more attributes or combination of attributes that are likely to be influenced by trends (color, style, length, pattern, and the like). When planning a product assortment, assortment planning system 140 may increase the weight associated with past performance (such as, for example, historical sales data) of products with attributes or combinations of attributes that are not likely to be influenced by trends and decrease the weight associated with past performance of products with attributes or combination of attributes that are likely to be influenced by trends.

For example, a product assortment planning system 140 may identify that past performance indicates a cotton t-shirt from Brand X offered in three colors sold very well in three previous seasons. Because fabric and brand are unlikely to be affected by trends, assortment planning system 140 may increase the weight of historic sales data for the previous three seasons when predicting a buy quantity for an upcoming product assortment that includes the same cotton t-shirt from Brand X. However, because colors are affected by trends, assortment planning system 140 may place less weight on past performance when selecting which colors of the t-shirt from Brand X to include in an upcoming product assortment. Instead, assortment planning system 140 may increase the weight of identified trends when selecting the colors of the t-shirt from Brand X to include in the product assortment. For example, during the long lead time between planning a product assortment and selling the product assortment, trend aggregation system 110 may continue to identify and monitor trends that may influence color selection for the t-shirts from Brand X. When trend identification system 110 identifies a trend that is likely to influence the color selection for the exemplary t-shirts, assortment planning system interface 208 indicates to trend aggregation system 110 to transmit the identified trend to assortment planning system 140, which may then initiate one or more actions to reduce the impact of the identified trend on the product assortment, such as, for example, to resolve the change in consumer demand predicted by the trend by removing or adding one or more products to the product assortment, reducing or increasing future buy quantities, offering promotional discounts, altering a pricing scheme, and the like.

According to embodiments, scoring engine 210 of server 112 calculates a social affinity score representing the probability of a product trending during an assortment planning period. As described in more detail herein, scoring engine 210 may analyze the identified attributes, products, and associated contextual data from one or more data feeds 120 and generate a social affinity score. According to embodiments, the social affinity score may indicate to a planner, buyer, or other merchant a score representing the probability of a product trending during an assortment planning period. The score may represent if a product having one or more identified attributes is trending or not based on images from social media (such as, for example, TWITTER, INSTAGRAM, FACEBOOK, PINTEREST, and the like), and may take into account, for example, the number of 'pins' (e.g. from PINTEREST), shares and likes (e.g. from INSTAGRAM and/or FACEBOOK), celebrity-endorsements, number of followers of a celebrity, number of retweets (e.g. from TWITTER), a product sentiment associated with an image, metadata, tags, image associations, and one or more additional factors, according to particular needs. According to some embodiments, the social sentiment score indicates how customers are likely to react to a particular product introduced in a product assortment for an upcoming season based, at least in part, on one or more data feeds 120.

Database 114 of trend aggregation system 110 may comprise one or more databases or other data storage arrangement at one or more locations, local to, or remote from, database 114. Database 114 comprises, for example, product data 220, image data 222, model data 224, attribute definitions 226, and social media repository data 228. Although, the database is shown and described as comprising product data 220, image data 222, model data 224, attribute definitions 226, and social media repository data 228, embodiments contemplate any suitable number or combination of these, located at one or more locations local to, or remote from, trend aggregation system 110, according to particular needs.

Product data 220 of database 114 may comprise one or more data structures for identifying, classifying, and storing data associated with products, including, for example, a product identifier (such as a Stock Keeping Unit (SKU), Universal Product Code (UPC) or the like), product attributes and attribute values, sourcing information, and the like. According to embodiments, product data may comprise data about one or more products organized and sortable by, for example, product attributes, attribute values, product identification, sales quantity, demand forecast, or any stored category or dimension.

According to embodiments, image data 222 of database 114 comprises product images, which may include digital images, digital videos, or other like imaging data of one or more retail products. According to embodiments, image data 222 may be raw data received from an imaging sensor or a standard format computer-readable image file. Color models, such as, for example, the Red Green Blue ("RGB") model and the Hue Saturation Value ("HSV") model, may be used to transform analog signals to digital signals and for storing digital images and videos. Color models comprise image pixels as basic elements and may include other abstractions of information. According to an embodiment, standard color models may provide how pixels of an image are represented digitally, how color images are configured by users, and how image files are stored in computers. Using the RGB color model, for example, each pixel in an image is identified by a value for the red channel ("R"), a value for the green channel ("G"), and a value for the blue channel ("B"). For example, a pixel that is pink would comprise specific numerical values for each of the channels (R, G, and B) that, when mixed, create a pink color. Alternatively, a pixel that is purple would comprise different values for each of the R, G, and B channels that, when mixed, create a purple color. According to embodiments, RGB data may be stored in a three-dimensional matrix where each cell represents a pixel and a pixel is a combination of the R, G, and B channel values. Embodiments contemplate image data 222 comprising metadata describing, for example, picture size, color depth, source of the photo (social media site, account holder, name of person, or other like source of the photo), sentiment (such as, for example, a feeling or connotation associated with the photo (positive, trendy, fashionable, negative, unfashionable, out-of-style, and the like), location (location where the photo was taken and/or location depicted in the photo), and/or one or more tags comprising items or attributes identified in the photos or associated with the photos.

Model data 224 of database 114 may comprise a product and/or attribute-identification model based on artificial neural networks. Embodiments of the product and/or attribute-identification model may receive image features, which are the input to a neural network that learns model parameters in an unsupervised fashion to identify products and/or product attributes. According to embodiments, model data 224 comprises a dynamic social feed model and/or a conventional time-series model that are used to identify and quantity fashion trends based on products and attributes identified in one or more images.

Attribute definitions 226 of database 114 may comprise a hierarchy of products and/or product attributes for one or more retail products. According to embodiments, trend aggregation system 110 identifies products, attributes, and/or attribute values from one or more images to identify and quantify trends for use in retail assortment planning. Embodiments contemplate a uniform product, attribute, and/or attribute value labeling system that unifies product, attribute, and attribute-value identification and generates consistent values, labels, and codes for different products, different departments, different supply chain entities, and the like so that one or more enterprises may use consistent identification parameters to simplify assortment planning and other supply chain planning decisions.

Social media repository data 228 may comprise images and associated combinations of attributes and/or products identified in the images, URL or other source of the data, sentiment for each image (number of pins/positive or negative words in comments), meta-attributes, and any other associated data. For example, social media repository data 228 may comprise social media data sourced from one or social media entities 130 and any data identified from or associated with the social media image or post. As described above, trend aggregation system 110 receives data from one or more data feeds 120 and automatically derives the color, category, type, and other information of one or more fashion retail products. Those attributes may then be stored in social media data repository 228, so that when assortment planning system 140 is designing a product for a new product assortment, the trends for particular attributes of the new product design may be sourced from social media data repository 228.

Figure 3:
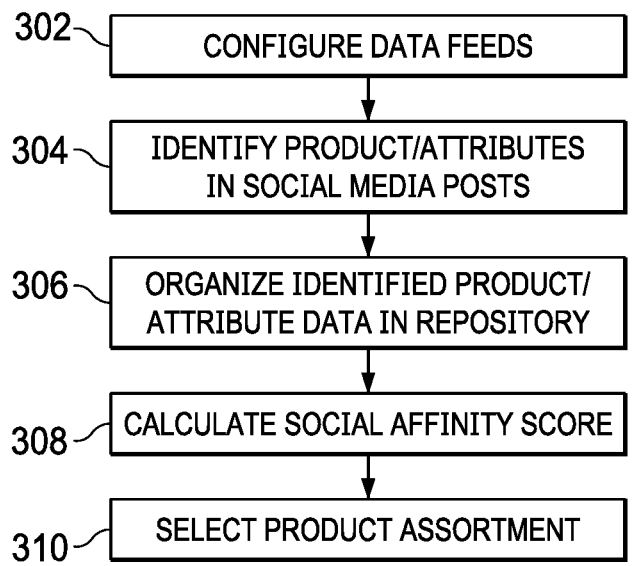
FIG. 3 illustrates a method of trend aggregation, in accordance with an embodiment.

FIG. 3 illustrates method 300 of trend aggregation, in accordance with an embodiment. Method 300 of trend aggregation proceeds by one or more activities, which, although described in a particular order, may be performed in one or more combinations of the one or more activities, according to particular needs.

At activity 302, trend aggregation system 110 configures one or more data feeds 120. As described above, one or more data feeds According to embodiments, trend aggregation system 110 configures one or more data feeds 120 to automatically retrieve supply chain data, historical data, social media data, customer data, and the like to identify and quantify trends for one or more retail products. Trend aggregation system 110 may configure one or more data feeds 120 by selecting or setting one or more data feed configuration parameters such as, for example, a resource selection configuration parameter which identifies a channel, board, profile, page, tag, URL, or the like of one or more social media entities 130, product review websites, fashion blogs, websites or databases of one or more supply chain entities 170, or other product trend resource locations. Data feed configuration parameters may also include time stamp configuration parameters (which indicate whether to time stamp the data of one or more data feeds 120 providing an indication of the age of a trend indicated by the data). According to some embodiments, data feed configuration parameters may include update scheduling configuration parameters, which indicate whether to automatically retrieve data specified by resource selection configuration parameters and the frequency, intervals, or time periods with which one or more data feeds 120 are updated. Trend aggregation system 110 may then automatically and periodically retrieve one or more images and related product trend data from the one or more resources according to a selected configuration.

For example, in response to receiving an input comprising selecting or altering one or more data feeds configuration parameters, data feeds configuration interface 206 may configure the one or more data feeds 120 to identify trends for women's tops including, supply chain data indicating sales data from the one or more retailers 178 such as, for example, attributes and identification of products selling better, worse, or the same a forecast, the identity and characteristics of stores having higher or lower inventory than forecasted, and store and customer segments that correlate to purchase or avoidance of products having particular attributes. By way of a further example, data feeds configuration interface 206 may configure one or more data feeds 120 comprising social media data feed 126 to retrieve social media data comprising women's tops from one or more social media entities 130. For example, data feeds configuration interface 206 of trend aggregation system 110 may configure one or more data feeds 120 to fetch social media data of similar women's tops to a planned product assortment and store the images, comments, reviews, ratings, and the like. For example, when planning a particular women's top, trend aggregation system 110 may select and configure one or more data feeds 120 to generate data related to women's tops products, such as, for example, supply chain data of the current inventory levels of women's tops at one or more supply chain entities 170, historical sales of women's tops, customer preference data of women's tops from fashion shows, blogs, and the like, and social media resources from one or more supply chain entities that identify trends for women's tops. For example, when planning a short-sleeve floral women's top, trend aggregation system 110 may configure sources for similar shirts from PINTEREST, FACEBOOK, INSTAGRAM and store the sourced data in supply chain data repository 228.

Because the amount of information retrieved from one or more data sources may be extremely large, embodiments contemplate trend identification system 110 configuring one or more data feeds 120 to sort and narrow the retrieved data, including, for example, specifying particular images, data, or data types to exclude from one or more data feeds 120.

At activity 304, trend identification system 110 identifies products and product attributes in images from one or more social media entities 130. According to an embodiment, image ingester and validator module 202 analyzes images of products received from one or more data sources 120 and identifies attributes and identifications of products, which may include one or more of product categories, products, product attributes, product attribute values, or other hierarchical classifications of products that are featured in the image. As described herein, image ingester and validator module 202 employs a convolutional neural network model that learns model parameters and identifies features that are used to identify images from one or more social media entities 130, fashion blogs, retailers website, and/or other sources of product images, reviews, and the like, and stores identified attributes and identifications of products with the image features as image data 222 of database 114.

Figure 4:
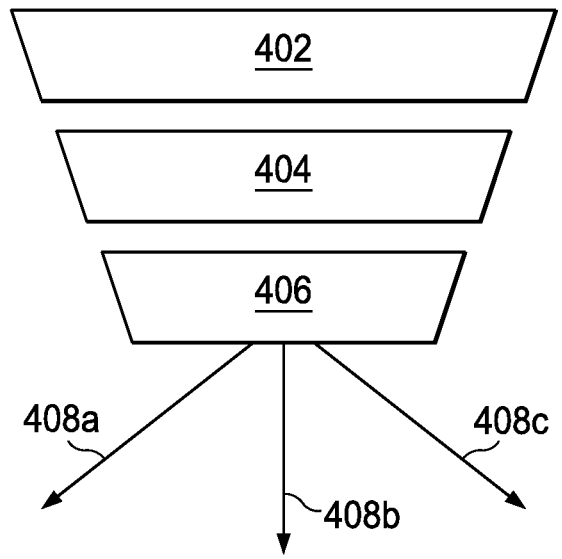
FIG. 4 illustrates hierarchical narrowing of data from one or more social media entities, in accordance with an embodiment.

FIG. 4 illustrates hierarchy 400 comprising a narrowing selection of data from one or more social media entities 130, in accordance with an embodiment. According to embodiments, hierarchy 400 comprises three levels: first level 402, second level 404, and third level 406. At a highest level of hierarchy, first level 402, all data on one or more social media entities 130 would be overwhelming and not useful for selecting products in a particular product category. At the next lower level of the hierarchy, second level 404, trend aggregation system 110 may select and configure particular URLs or other data sources from one or more social media entities 130 to fetch social media information associated with only a particular product category. However, even particular URLs will frequently have many product categories or with many attributes. As described above in connection with activity 304, trend identification system 110 identifies a product and/or product attribute in particular social media posts to reach a lowest level of hierarchy 400, third level 406. At third level 406, trend identification system 110 identifies the product and/or product attributes in particular social media posts and sorts, aggregates, and organizes identified data 408a-408c in social media data repository 228 according to a product attribute hierarchy based on the attributes identified in each image.

At activity 306, trend identification system may sort, aggregate and organize identified data in the social media data repository using image ingester and validator module 202. As described herein, trend aggregation system 110 receives images from one or more data feeds 120 and identifies attributes of one or more fashion retail products using the convolutional neural network model and organizes the images and data associated with the images in social media repository data 228. According to one embodiment, the images and associated data are stored in social media repository data 228 according to the product attribute hierarchy. Trend aggregation system 110 may match attributes from planned products of a future product assortment with the data sourced from these social media resources.

At activity 308, trend aggregation system 110 may analyze the identified attributes, products, and associated contextual data from one or more data feeds 120 and identify trends using trend analyzer 204 and a social affinity score using scoring engine 210. As described in more detail herein, trend analyzer 204 identifies the frequency and sentiments associated with product attributes and assigns an indication of whether the trend is positive or negative. In addition, score engine 210 generates a social affinity score that represents the probability of a product trending during an assortment planning period based on trends associated with a combination of one or more attributes of the product. Identified trends and scores may be stored with their associated images according to the identified products and/or product attributes in social media repository data 228. Continuing with exemplary women's tops product assortment, trend aggregation system 110 identifies similar or related attributes and combinations of attributes of one or more related products during a preceding time period to identify if the selected short-sleeve floral women's tops has attributes which are trending up, down, or neutral. This trend identification may also include a customer sentiment score and/or one or more associated comments for any suitable preceding time period to identify additional contextual information for one or more combination of attributes associated with the short-sleeve floral women's tops.

Figure 5:
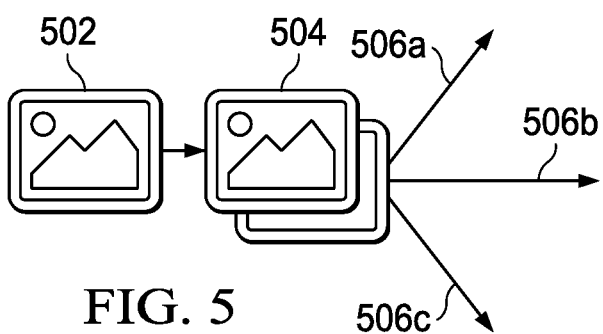
FIG. 5 illustrates generating a social sentiment score for one or more images, in accordance with an embodiment.

FIG. 5 illustrates flowchart 500 describing calculating a social sentiment score for one or more images, in accordance with an embodiment. According to embodiments, an inventory product image 502 in an assortment or a customer database is compared with similar social media images 504 in the same product hierarchy during a similar timeframe. Based on the identified features of the one or more images and associated contextual or identified information, trend aggregation system 110 generates a categorized social sentiment score 506a-506c that is associated with particular attributes and combinations of attributes according to the product attribute hierarchy.

At activity 310, trend aggregation system 110 may automatically present the social affinity and other identified trend information to assortment planning system 140. For example, during assortment planning trend aggregation system 110 may automatically populate one or more visual elements of a user interface of assortment planning system 140 with data, graphs, scores, trending product or product attribute, or the like based on the season and product being planned by assortment planning system 140. According to embodiments, trend aggregation system 110 enables buyers and planners to automatically review trends "in-context" during the assortment selection process, identifies missing products and categories in a planned product assortment, and enables more quickly reacting to trends.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A trend aggregation system, comprising:
   computer comprising a processor and a memory, the computer configured to:
   receive an initial set of images as image data from an imaging sensor;
   transform analog image values from each image of the initial set of images via a RGB model to digital image values wherein each pixel of each image is identified as a value corresponding to a red channel, a value corresponding to a green channel and a value corresponding to a blue channel;
   store each of the transformed initial set of images as digital RGB data in a three-dimensional matrix;
   learn by train a neural network model using unsupervised learning to identify one or more product categories and one or more product attributes based on at least the digital image values;
   identify one or more attribute values from the digital image values using the learned neural network model;
   quantify a social affinity score of one or more items based on recentness, relevance, and similarities of the identified one or more attribute values to an attribute value of a potential product for a product assortment; and
   update the learning of the neural network model to identify at least one additional product attribute based, at least in part, on one or more additional images indicating an updated trend on a social media feed.

2. The trend aggregation system of claim 1, wherein the computer is further configured to:
   receive an image of at least one additional item;
   identify a product attribute from the image of the at least one additional item; and assign an attribute value to the at least one additional item based, at least in part, on the identified attribute value from the image of the least one additional item and the attribute values of the at least two items.

3. The trend aggregation system of claim 2, wherein the computer is further configured to:
   access attribute values associated with the at least one additional item from a database;
   access a uniform attribute coding for the supply chain entity; and
   modify the attribute values associated with the at least one additional item based, at least in part, on the assigned attribute value and the uniform attribute coding for the supply chain entity.

4. The trend aggregation system of claim 3, wherein the computer is further configured to:
   identify one or more image features from the initial set of images using a convolutional neural network; and
   assign each of the one or more image features with the one or more attribute values identified from the initial set of images.

5. The trend aggregation system of claim 4, wherein the computer identifies the product attribute from the image of the at least one additional item using the one or more image features identified from the initial set of images.

6. The trend aggregation system of claim 5, wherein the computer is further configured to:
   assign the social affinity score to a combination of one or more product attribute values.

7. The trend aggregation system of claim 6, wherein the computer is further configured to:
   receive a combination of one or more product attributes planned for inclusion in a product assortment; and
   calculate the social affinity score for a combination of one or more product attribute values for the one or more planned product attributes.

8. A computer-implemented method, comprising:
   receiving, using a computer comprising a processor and a memory, an initial set of images as image data from an imaging sensor;
   transforming analog image values from each image of the initial set of images via a RGB model to digital image values wherein each pixel of each image is identified as a value corresponding to a red channel, a value corresponding to a green channel and a value corresponding to a blue channel;
   storing each of the transformed initial set of images as digital RGB data in a three-dimensional matrix;
   learning by a neural network model using unsupervised learning to identify one or more product categories and one or more product attributes based on at least the digital image values;
   identifying, using the computer, one or more attribute values from the digital image values using the learned neural network model;
   quantifying, using the computer, a social affinity score of one or more items based on recentness, relevance, and similarities of the identified one or more attribute values to an attribute value of a potential product for a product assortment; and
   updating, using the computer, the learning of the neural network model to identify at least one additional product attribute based, at least in part, on one or more additional images indicating an updated trend on a social media feed.

9. The computer-implemented method of claim 8, further comprising:
   receiving an image of at least one additional item;
   identifying a product attribute from the image of the at least one additional item; and
   assigning an attribute value to the at least one additional item based, at least in part, on the identified attribute value from the image of the least one additional item and the attribute values of the at least two items.

10. The computer-implemented method of claim 9, further comprising:
    accessing attribute values associated with the at least one additional item from a database;
    accessing a uniform attribute coding for a supply chain entity; and
    modifying the attribute values associated with the at least one additional item based, at least in part, on the assigned attribute value and the uniform attribute coding for the supply chain entity.

11. The computer-implemented method of claim 10, further comprising:
    identifying one or more image features from the initial set of images using a convolutional neural network; and
    assigning each of the one or more image features with the one or more attribute values identified from the initial set of images.

12. The computer-implemented method of claim 11, wherein identifying the product attribute from the image of the at least one additional item comprises using the one or more image features identified from the initial set of images.

13. The computer-implemented method of claim 12, further comprising:
    assigning the social affinity score to a combination of one or more product attribute values.

14. The computer-implemented method of claim 13, further comprising:
    receiving a combination of one or more product attributes planned for inclusion in a product assortment; and
    calculating the social affinity score for a combination of one or more product attribute values for the one or more planned product attributes.

15. A non-transitory computer-readable medium embodied with software, the software when executed by a processor, cause the processor:
    receives an initial set of images as image data from an imaging sensor;
    transforms analog image values from each image of the initial set of images via a RGB model to digital image values wherein each pixel of each image is identified as a value corresponding to a red channel, a value corresponding to a green channel and a value corresponding to a blue channel;
    stores each of the transformed initial set of images as digital RGB data in a three-dimensional matrix;
    learns by a neural network model using unsupervised learning based on at least the digital image values;
    identifies one or more attribute values from the digital image values using the learned neural network model;
    quantifies a social affinity score of one or more items based on recentness, relevance, and similarities of the identified one or more attribute values to an attribute value of a potential product for a product assortment; and
    updates the learning of the neural network model to identify at least one additional product attribute based, at least in part, on one or more additional images indicating an updated trend on a social media feed.

16. The non-transitory computer-readable medium of claim 15, the processor further:

receives an image of at least one additional item;

identifies a product attribute from the image of the at least one additional item; and assigns an attribute value to the at least one additional item based, at least in part, on the identified attribute value from the image of the least one additional item and the attribute values of the at least two items.

17. The non-transitory computer-readable medium of claim 16, the processor further:

accesses attribute values associated with the at least one additional item from a database;

accesses a uniform attribute coding for a supply chain entity; and modifies the attribute values associated with the at least one additional item based, at least in part, on the assigned attribute value and the uniform attribute coding for the supply chain entity.

18. The non-transitory computer-readable medium of claim 17, the processor further:

identifies one or more image features from the initial set of images using a convolutional neural network; and assigns each of the one or more image features with the one or more attribute values identified from the initial set of images.

19. The non-transitory computer-readable medium of claim 18, wherein identifies the product attribute from the image of the at least one additional item comprises using the one or more image features identified from the initial set of images.

20. The non-transitory computer-readable medium of claim 19, the processor further:

assigns the social affinity score to a combination of one or more product attribute values.

* * * * *